United States Patent [19]

Luz, deceased et al.

[11] 4,246,936
[45] Jan. 27, 1981

[54] PIPE FOR TRICKLE IRRIGATION

[76] Inventors: Ephraim Luz, deceased, late of Moshav Kokhav Michael, Israel; by Cecilia Luz, heir; by Irit Luz, heir, both of Moshav Kokhav Michael, Mobile Post Sdeh Gat, Israel

[21] Appl. No.: 51,544

[22] Filed: Jun. 25, 1979

Related U.S. Application Data

[63] Continuation-in-part of Ser. No. 588,727, Jun. 20, 1975, abandoned.

[30] Foreign Application Priority Data

Aug. 20, 1974 [IL] Israel ........................................ 45501

[51] Int. Cl.³ .......................... E02B 13/00; B05B 1/20; B05B 1/30
[52] U.S. Cl. .................................. 138/103; 138/178; 239/145; 239/547; 405/43; 405/45
[58] Field of Search ....................... 138/103, 178, 177; 239/542, 547, 145; 405/43, 44, 45; 47/48.5

[56] References Cited

U.S. PATENT DOCUMENTS

| | | | |
|---|---|---|---|
| 349,874 | 9/1886 | Buhrer | 47/48.5 |
| 2,314,525 | 3/1943 | Summers | 239/547 X |
| 2,763,991 | 9/1956 | Kennon | 405/43 |
| 3,068,616 | 12/1962 | Shibata et al. | 405/43 X |
| 3,512,363 | 5/1970 | Whear | 239/542 X |
| 3,606,166 | 9/1971 | Whear | 239/542 X |
| 3,727,841 | 4/1973 | Hengesbach | 239/543 X |
| 3,753,352 | 8/1973 | McNally | 405/43 |
| 3,980,104 | 9/1976 | Kabai | 138/103 |
| 4,181,051 | 1/1980 | Drori | 239/547 X |

FOREIGN PATENT DOCUMENTS 618513  3/1927  France ........................................ 405/44

Primary Examiner—James E. Bryant, III
Attorney, Agent, or Firm—Silverman, Cass & Singer, Ltd.

[57] ABSTRACT

A drip irrigation pipe for use aboveground having conical apertures in the wall of the pipe at spacings corresponding to the space between the plants to be irrigated. The apertures diverge from the inside to the outside of the wall, with a center line making an angle of between 14° to 30° to the axis of the pipe and oriented in the direction of the water flow. Water is supplied at drip irrigation pressure of 10–35 p.s.i.

2 Claims, 2 Drawing Figures

PIPE FOR TRICKLE IRRIGATION

CROSS-REFERENCE TO RELATED APPLICATION

This is a continuation-in-part, of application Ser. No. 588,727, filed June 20, 1975 now abandoned.

BACKGROUND OF THE INVENTION

The invention relates to an improved drip irrigation pipe for effecting drip irrigation above the ground.

Many means for effecting a trickle outlet from irrigation pipes are known. These means may include elongated dripper units inserted in an irrigation pipe, elongated branch pipes of very narrow diameter leading off a main supply pipe, button-like dripper units inserted in a supply pipe and having a labyrinth path for the water between said supply pipe and the outlet from the unit, and other systems.

The main problems of drip irrigation are concerned with flow pressures and size of apertures, i.e. the pressures must be great enough to permit constant drip flow over the entire length of a long pipe without undue head loss, but not too great to cause damage to the pipe or to the outlets. The outlets must be large enough to prevent clogging by impurities, but must not be too large to cause a jet outflow to be formed.

In U.S. Pat. No. 3,727,841 (Hengesbach) pipes with outlets are described and claimed, which outlets cause jet sprays for the irrigation of plants. In one embodiment pairs of outlets in the wall of the pipes are arranged at such angles relative to each other that the jet emerging from one outlet of the pair impinges on that from the other outlet, so that a fog or mist covering a larger surface than that covered by a straight jet is created.

In U.S. Pat. No. 3,512,363 (Whear) a liquid distribution tube is described and claimed having cylindrical i.e. straight-walled discharge bores directed contrary to the axial direction at an angle of 6° to 14° from the axis of the tube. The liquid flowing in the tube is either under high pressure for atomized discharge or without pressure in a tube for subterranean irrigation.

SUMMARY OF THE INVENTION

The present invention provides an improved pipe for aboveground trickle irrigation having conical drip apertures diverging from the inside to the outside of the pipe wall. The apertures are positioned along the length of the pipe corresponding with the spacing of the plants to be irrigated. The apertures are formed with an acute angle of 14° to 30° with the axis of the pipe in the direction of fluid flow.

DESCRIPTION OF THE PREFERRED EMBODIMENT

Figure 1:
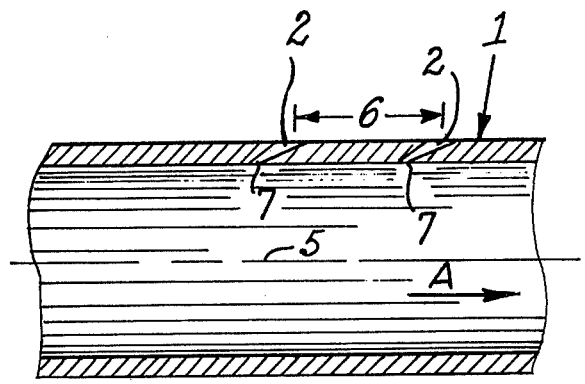
FIG. 1 is a partial longitudinal sectional view of the trickle pipe of the invention.
Figure 2:
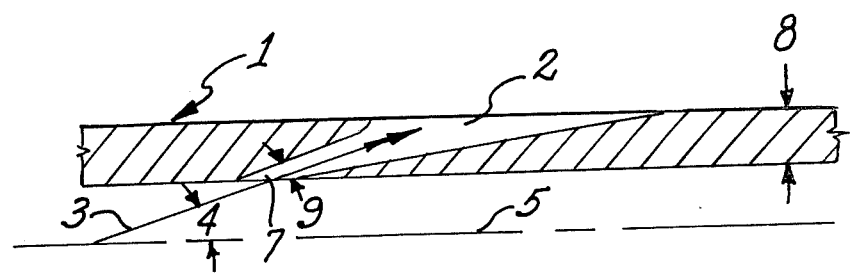
FIG. 2 is an enlarged partial longitudinal sectional view of one aperture of the pipe.

Referring now to FIGS. 1 and 2 the improved trickle irrigation pipe is designated at 1. The wall of the pipe has conical apertures 2 formed in one wall thereof. Each aperture has an axis 3 (FIG. 2) which forms an acute angle 4 with the axis 5 of the pipe 1. The acute angle 4 is formed with the axis 5 in the direction of irrigation fluid flow "A" (FIG. 1).

Applicant has found that with conventional pressures used for drip irrigation, i.e. at 10–35 p.s.i., an irrigation pipe provided in its wall with conical apertures 2 which are at an angle 4 to the pipe 1 in the direction of flow A and diverge outwardly, produce a drip flow at the exit. The substantially elongated elliptic shape of the aperture formed at the outer surface of the pipe 1 causes the water to adhere to the wall of the pipe overcoming the energy of the flow and preventing a jet from being formed by the discharged water.

The drip irrigation pipe 1 is used aboveground and the apertures 2 in its wall have a spacing 6 corresponding to the space between the plants to be irrigated. The apertures 2 are conically diverging from the inside to the outside of the wall with their center lines 3, preferably making an angle of 14° to 30° with the center line 5 of the pipe in the direction of the flow A.

Clogging is prevented, because each aperture 2 diverges toward the outside. Any dirt or other particle which may be caught within the opening 7 at the inner wall, will either be washed away by the pressure of the flow within the pipe 1 or will be forced into the aperture 2 where its widening walls will permit it to move out freely together with the flow therein. Thus, comparatively small diameter apertures may be provided in the wall of the pipe.

For best results it is preferable to make the relationship between the thickness of the pipe wall 8 and the initial inner diameter 9 of each aperture 2; such that with a given angular disposition 4 of the aperture of 14° to 30° the length of the aperture center line 3 in the wall is greater than three times its inner diameter 9. The apertures 2 preferably are made in the pipe 1 by a laser beam.

For example, one experiment was carried out with an angle 4 of 15° of the aperture 2 to the direction of flow A and an inner diameter 9 of the aperture of 0.008 inches. The thickness 8 of the pipe wall was 0.044 inches and the diameter of the pipe 1 was 0.5 inches. The water flow emitting from the aperture was observed to adhere to the outside surface of the pipe 1 in the pressure ranges of 10–35 p.s.i. At a pressure of 40 p.s.i. a short jet started forming.

What is claimed and desired to be secured by Letters Patent of the United States is:

1. An improved pipe for aboveground trickle irrigation at water supply pressures of 10–35 p.s.i., having a longitudinal axis and a direction of fluid flow in said pipe along said axis, and including fluid discharging apertures in the pipe wall opening to the outer surface thereof at spacings conforming to the spacings of the plants to be irrigated, the improvement comprising:
    each of the apertures having a conical shape diverging from the inside to the outside of the pipe wall and having a center line at an angle of 14° to 30° to the longitudinal axis of said pipe in the direction of fluid flow, to cause the fluid discharged through each of said apertures to adhere to said outer surface of said pipe to effect dripping of said discharged fluid from said pipe.

2. An improved pipe as claimed in claim 1 wherein:
    each aperture has a center line length in said wall and an inner aperture diameter in said wall, said length being at least three times as great as said inner diameter.

* * * * *